Oct. 18, 1960 H. W. CHAPMAN ET AL 2,956,517
FREIGHT SHIPPING DEVICE
Filed Oct. 12, 1956 12 Sheets-Sheet 1
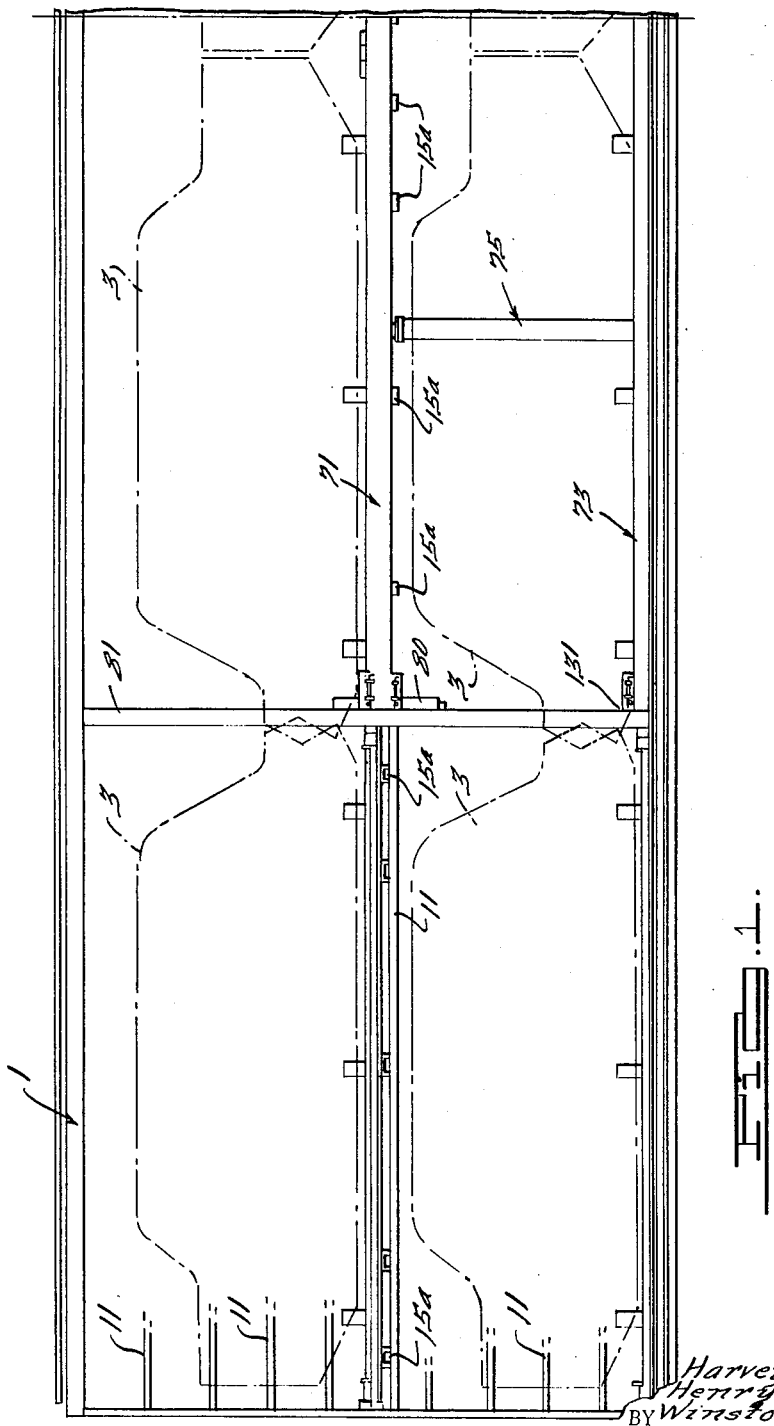
INVENTORS.
Harvey W. Chapman.
Henry H. Dunlap.
BY Winston T. Rigney.
Harness, Dickey & Pierce.
ATTORNEYS.

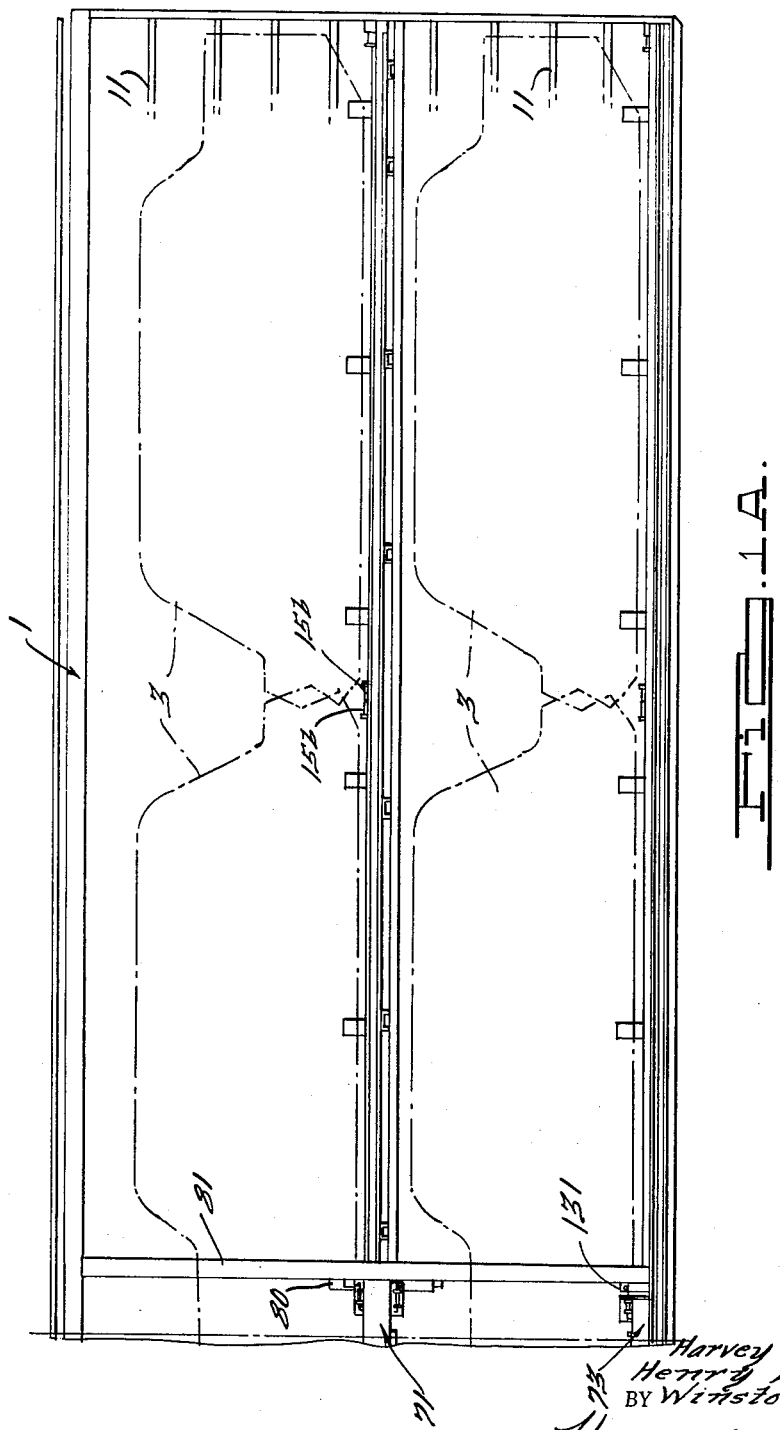

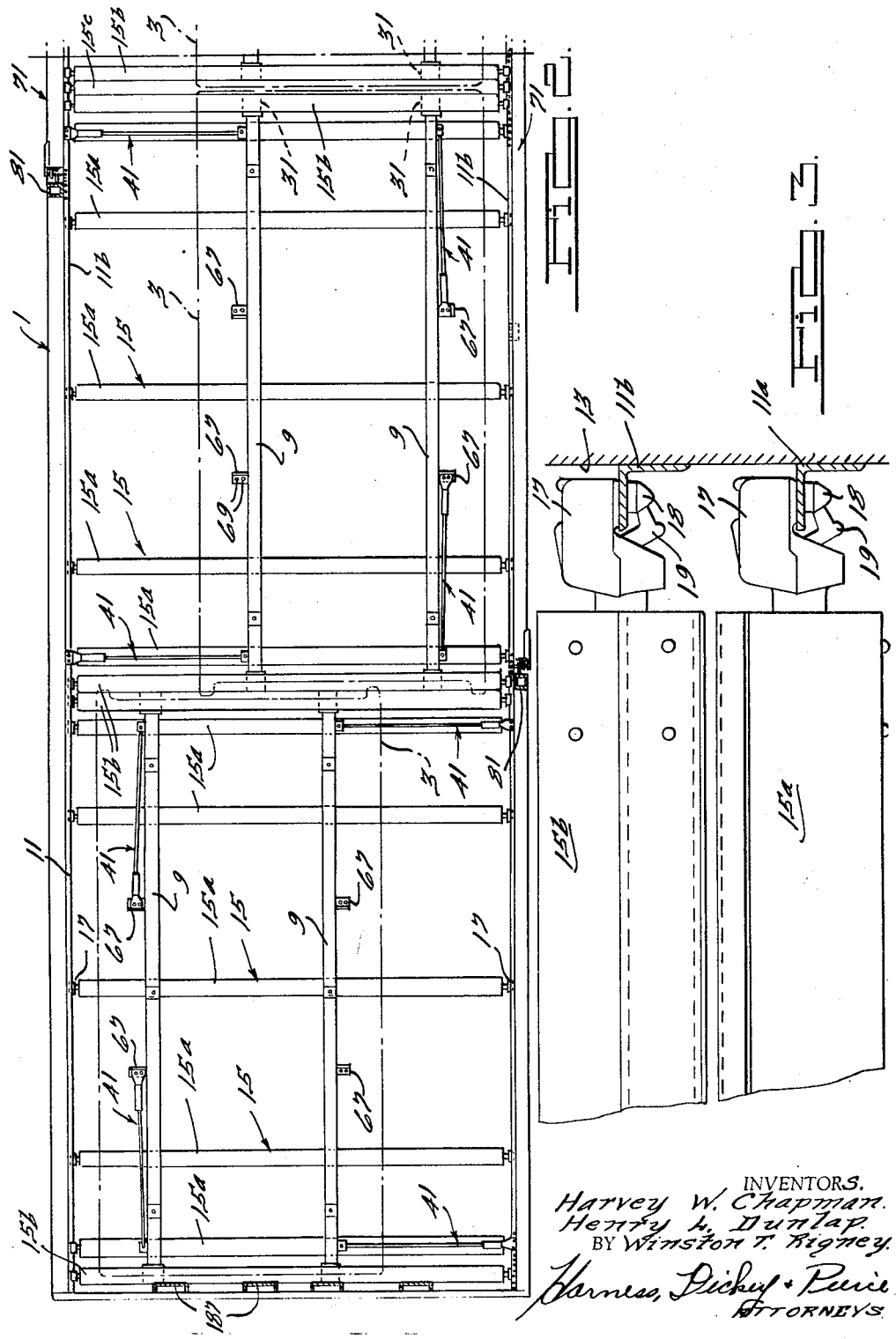

Oct. 18, 1960 H. W. CHAPMAN ET AL 2,956,517
FREIGHT SHIPPING DEVICE
Filed Oct. 12, 1956 12 Sheets-Sheet 4
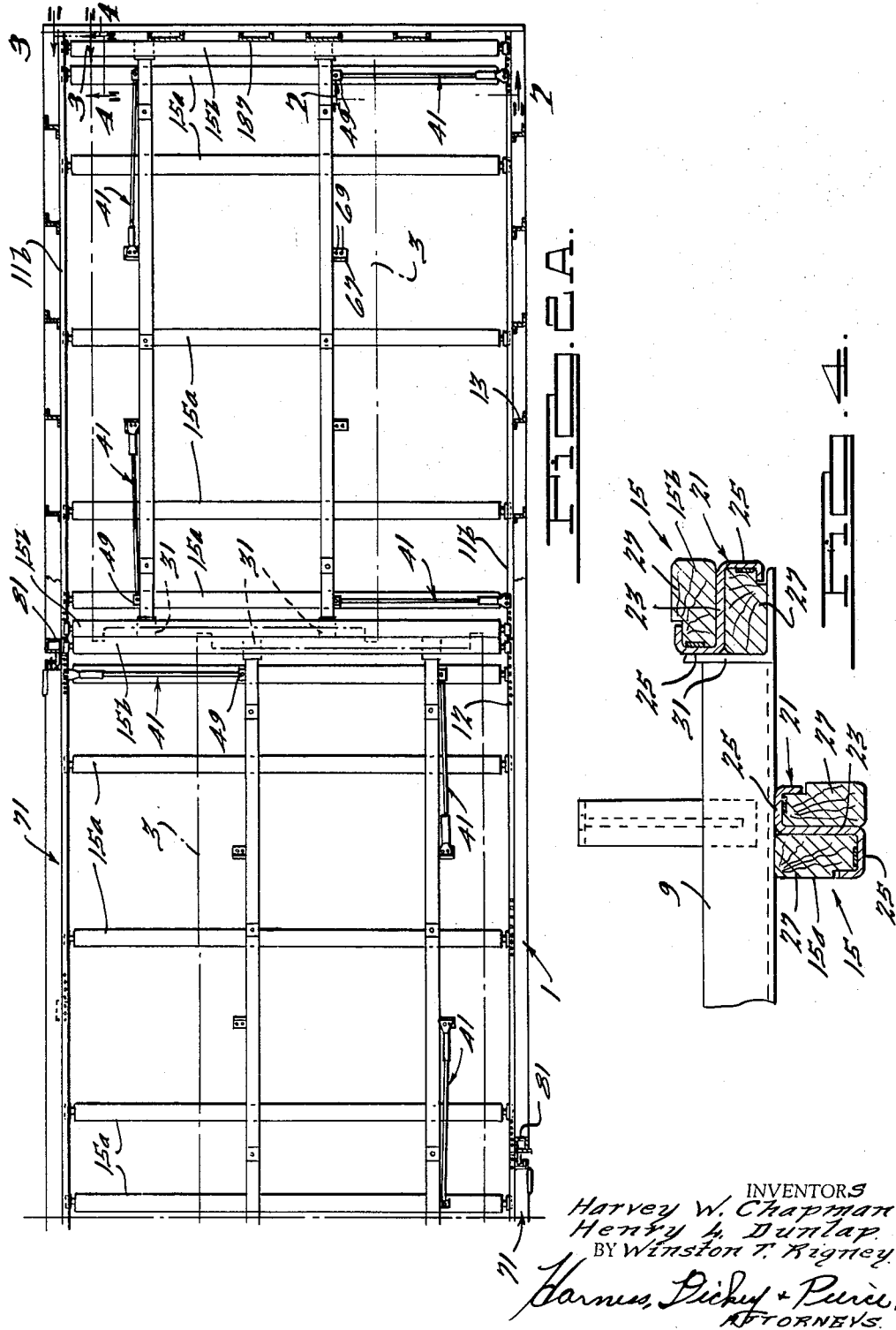
INVENTORS
Harvey W. Chapman
Henry L. Dunlap
BY Winston T. Rigney
Harness, Dickey & Pierce
ATTORNEYS Oct. 18, 1960     H. W. CHAPMAN ET AL     2,956,517
FREIGHT SHIPPING DEVICE
Filed Oct. 12, 1956     12 Sheets-Sheet 5
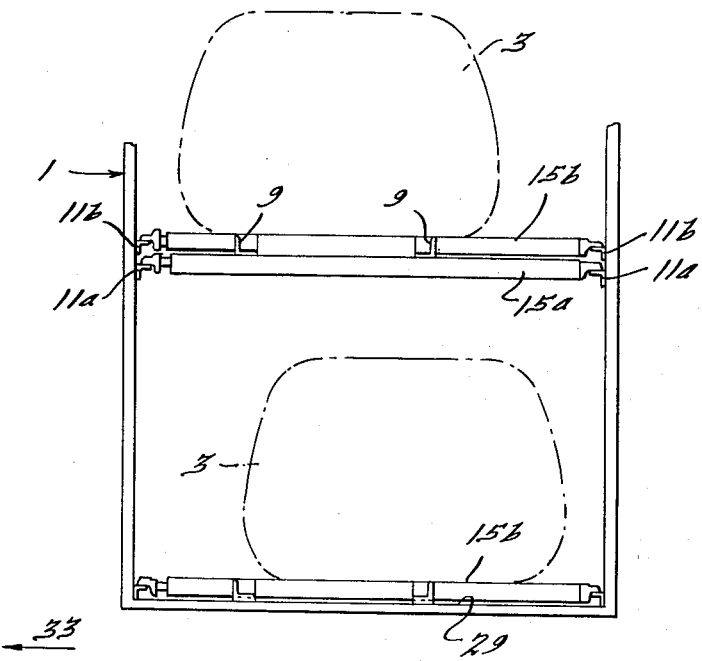
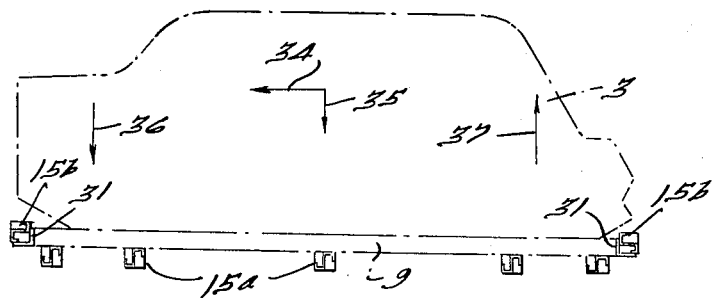
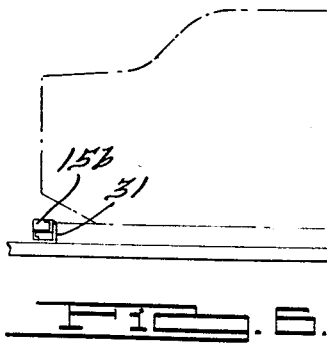

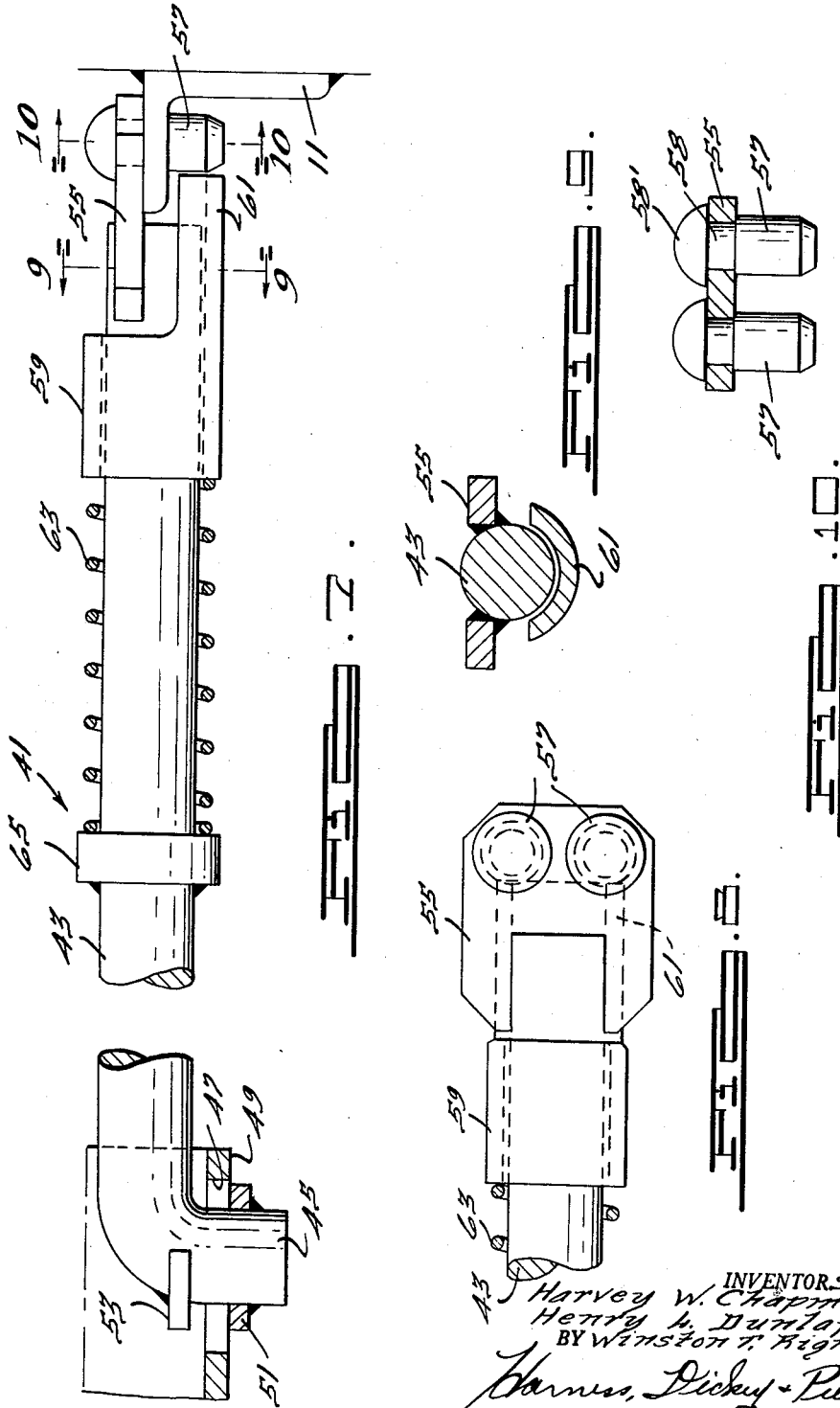

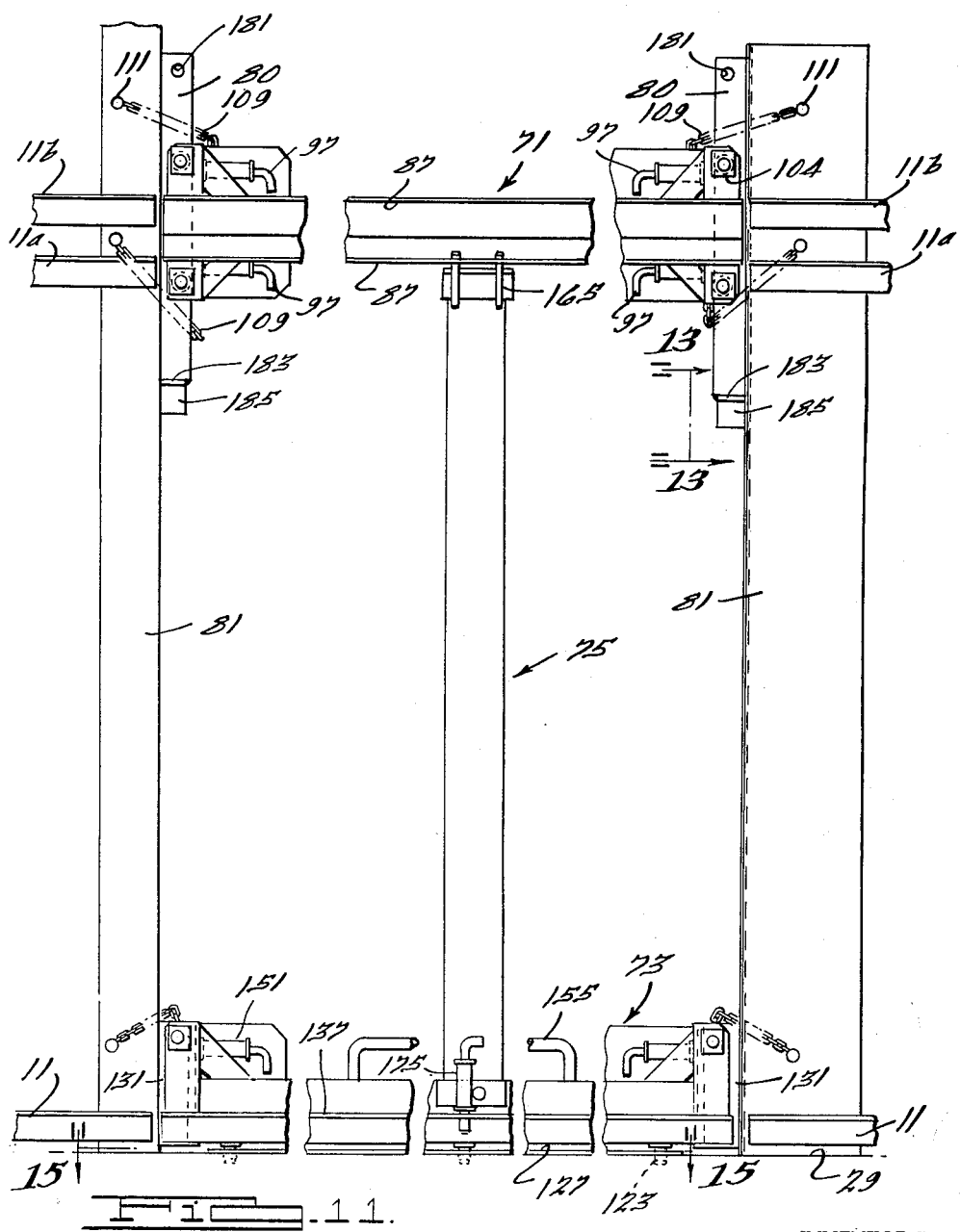

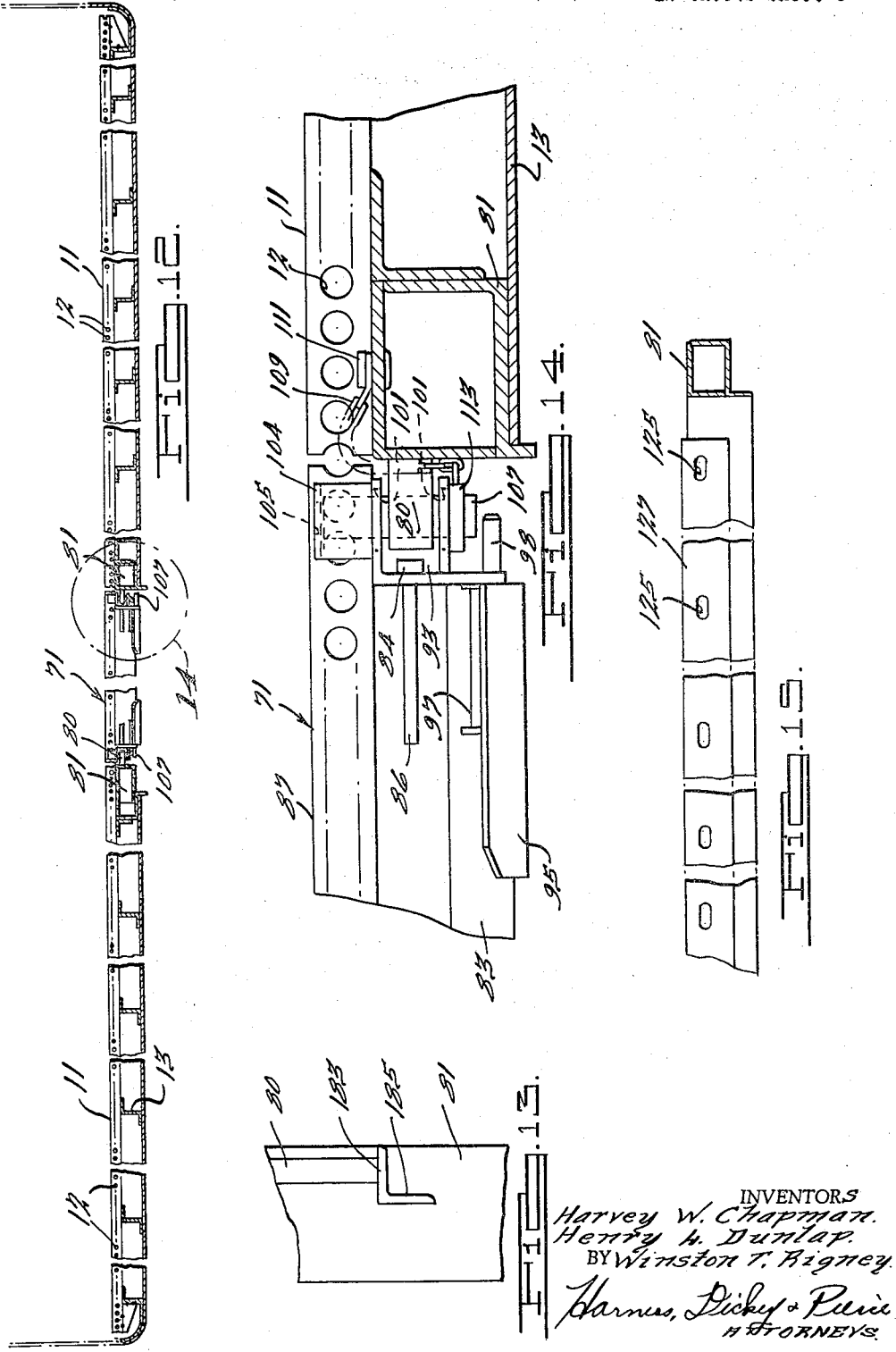

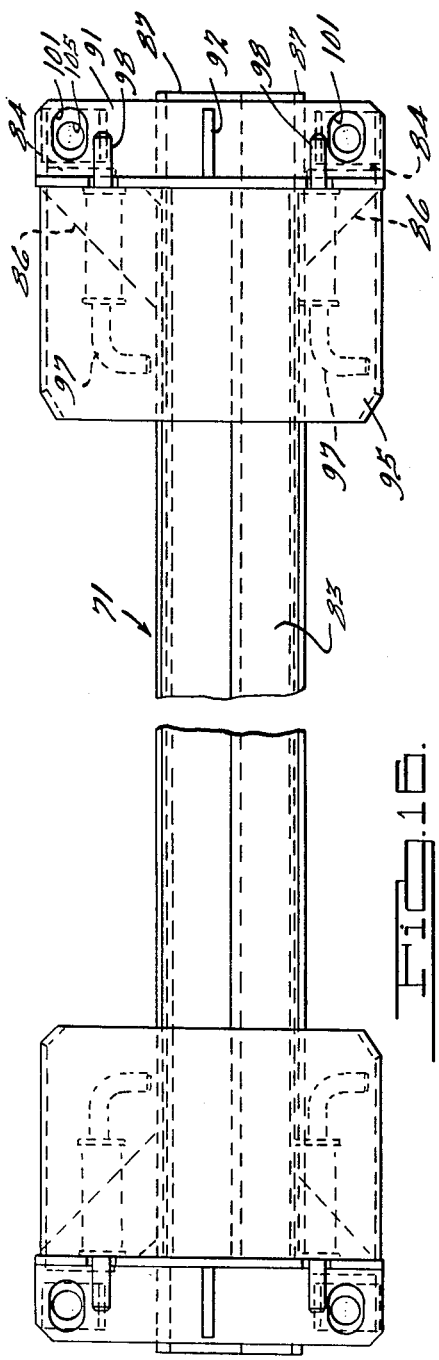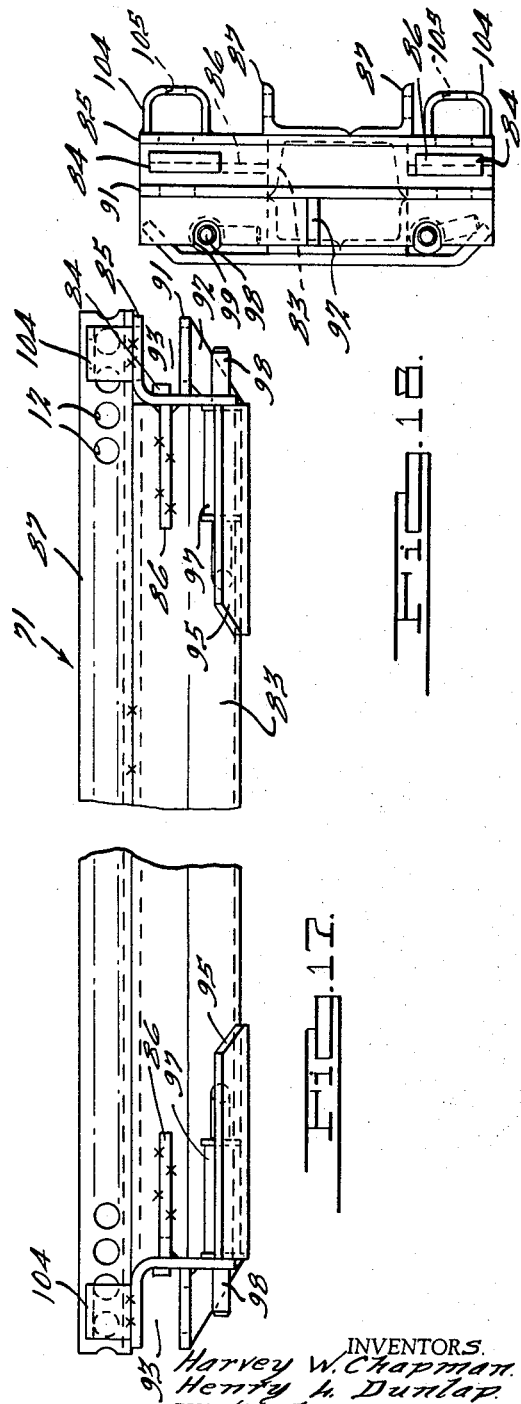

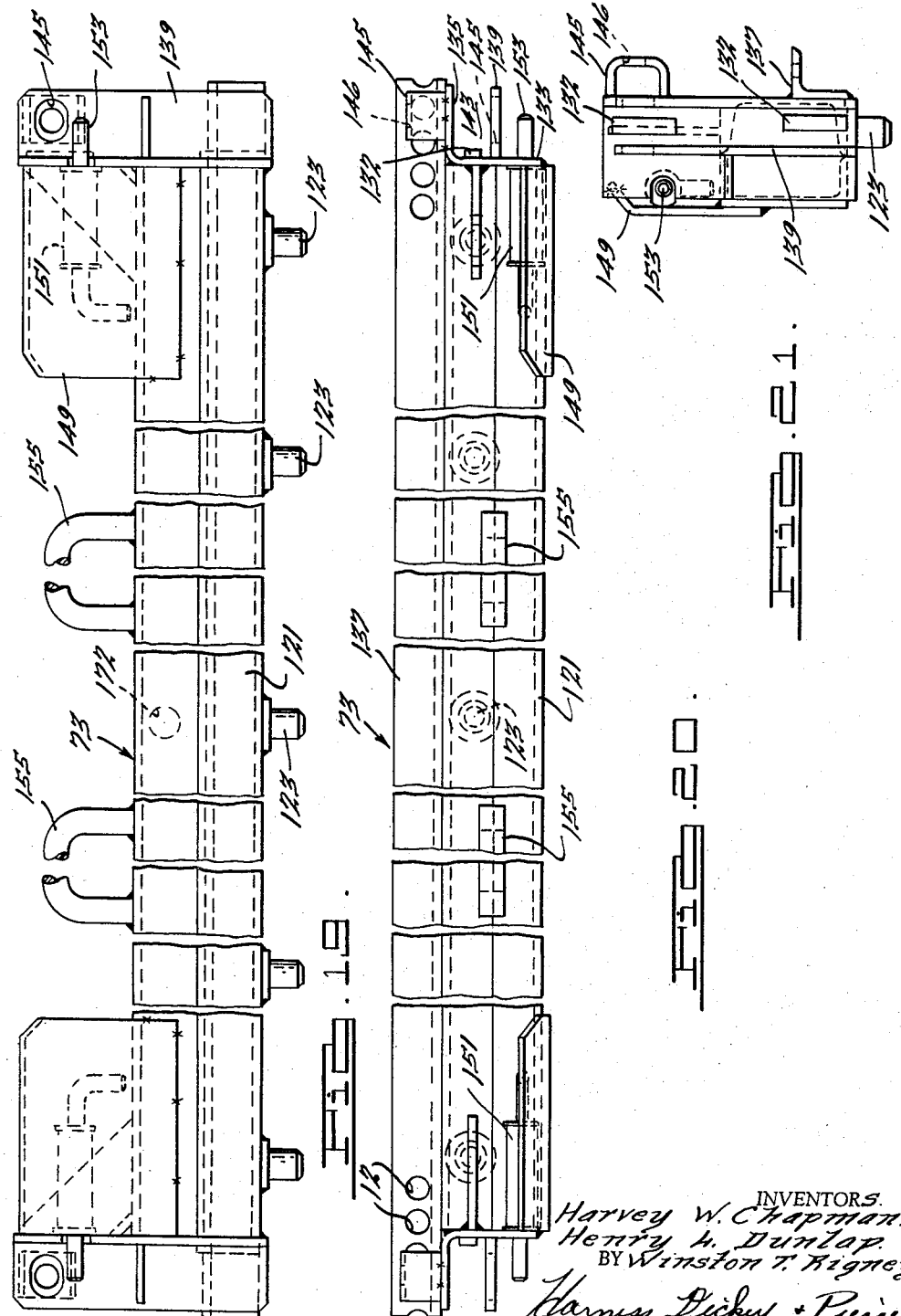

Oct. 18, 1960
H. W. CHAPMAN ET AL
2,956,517
FREIGHT SHIPPING DEVICE
Filed Oct. 12, 1956
12 Sheets-Sheet 11
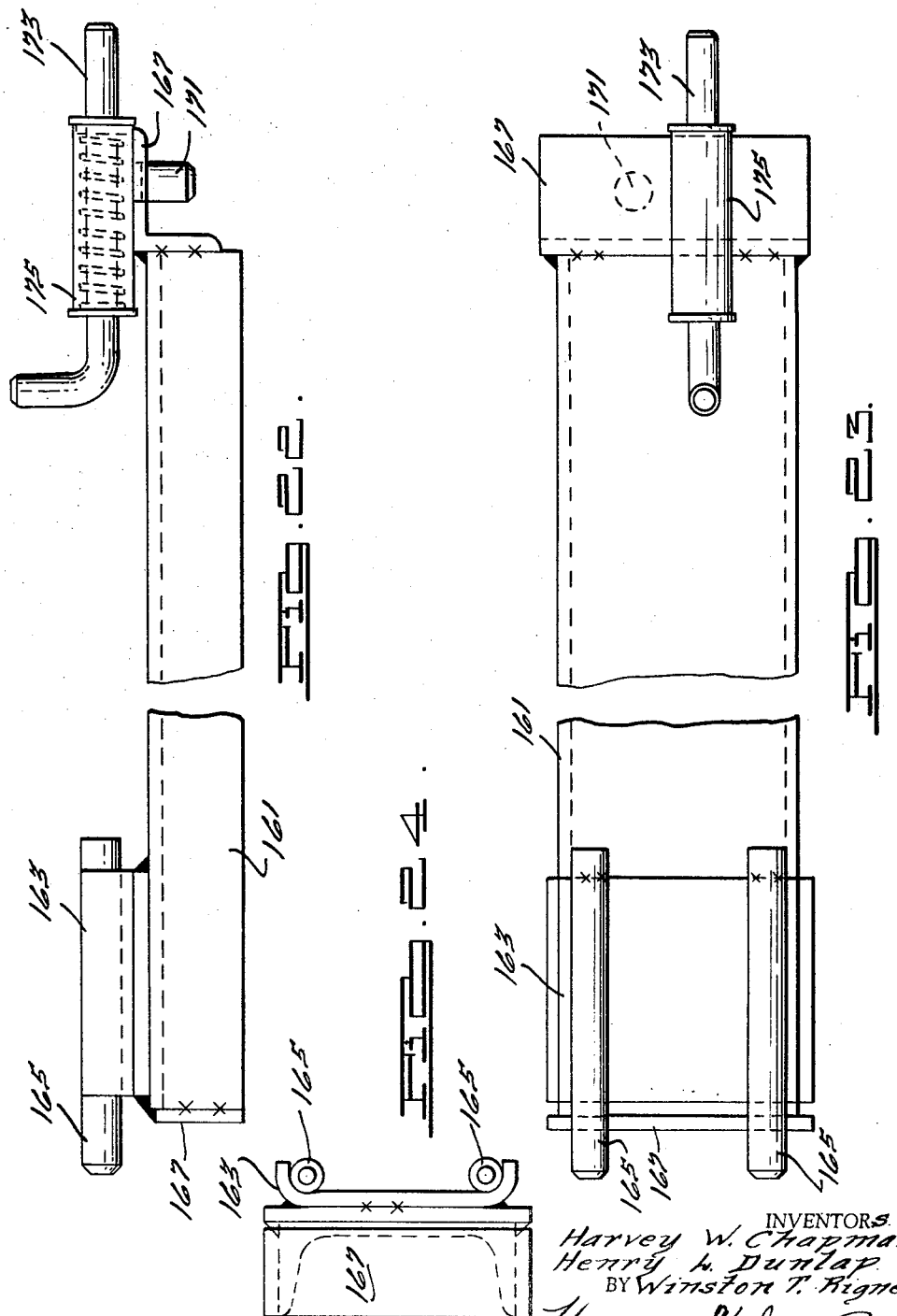
INVENTORS.
Harvey W. Chapman.
Henry L. Dunlap
BY Winston T. Rigney
Harness, Dickey & Pierce
ATTORNEYS.

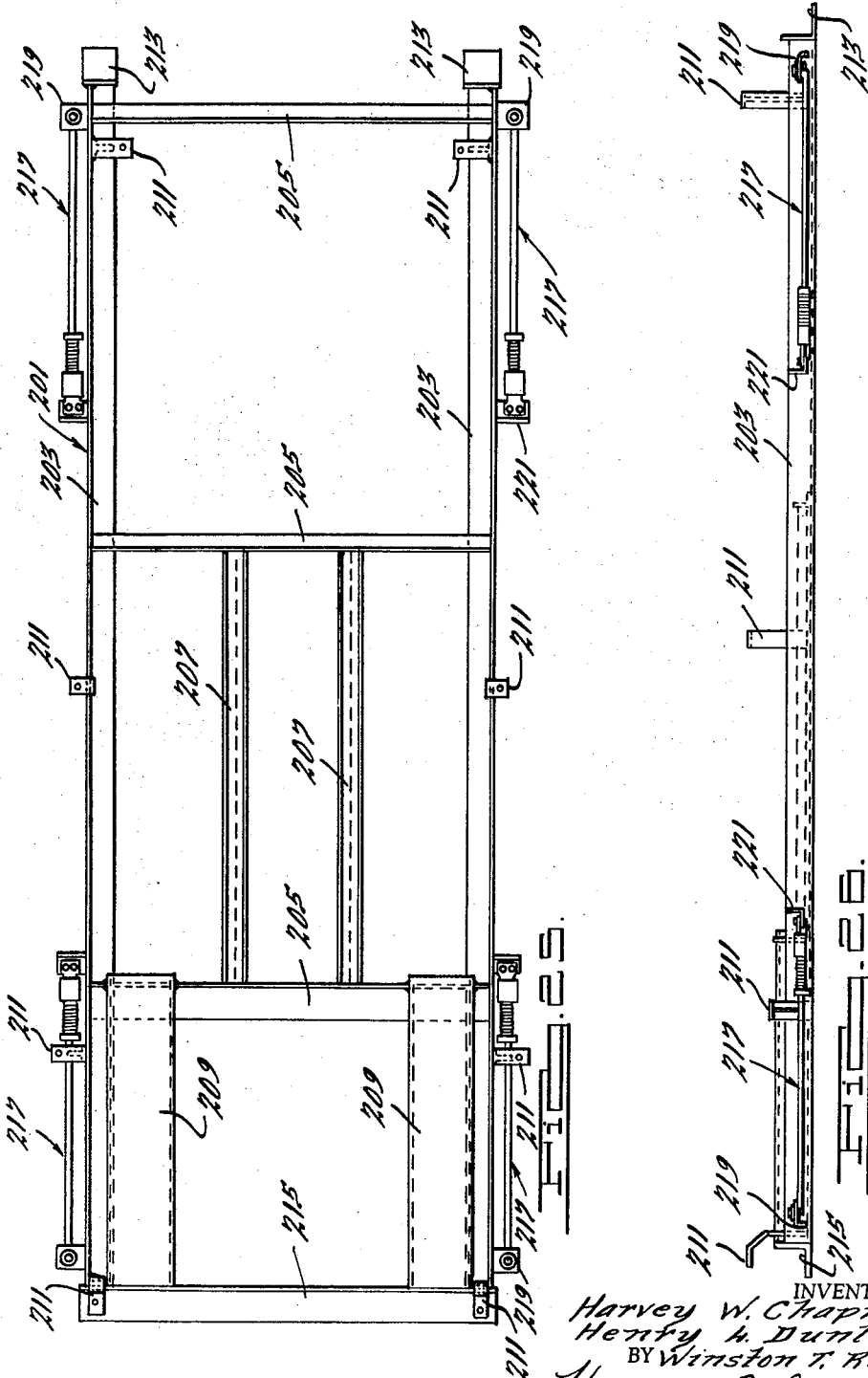

United States Patent Office 2,956,517
Patented Oct. 18, 1960

2,956,517

FREIGHT SHIPPING DEVICE

Harvey W. Chapman, Detroit, Henry L. Dunlap, Dearborn, and Winston T. Rigney, Livonia, Mich., assignors to Evans Products Company, Plymouth, Mich., a corporation of Delaware Filed Oct. 12, 1956, Ser. No. 615,525

13 Claims. (Cl. 105—368)

Our invention is directed to the shipping by railroad car of automobile bodies. While it is the main concern of our invention to provide means for shipping automobile bodies, it will be appreciated that the principles we have developed and employed can be used to provide means for the safe shipping of other bulky articles such as refrigerators, washing machines, etc.

As is well known, it is customary in the mass production of automobiles to manufacture component parts at various different locations and ship these parts to one or more plants for assembly. In order to maintain the advantage of part manufacture at diversified locations, it is necessary that the cost of shipping the component parts be held to a minimum and that damage during the course of shipment be virtually eliminated. This is particularly true with respect to the automobile body itself which comprises the largest and one of the most fragile of the component parts that goes into an automobile.

It is the object of the present invention to provide a support and brace system for the shipping of automobile bodies which makes them relatively easy to handle and which provides a bracing setup and method of loading and unloading that will minimize, if not substantially eliminate, damage to the bodies during shipment.

It is another object of this invention to provide for the shipment of automobile bodies by means of railroad equipment already available on the open market, thus eliminating the need for "special" railroad cars with the accompanying high cost and entangling Government and railroad regulations.

It is another object of this invention to provide a system for shipping automobile bodies which requires no bolting, nailing, or similar rigid and time consuming connections to be made when the automobile bodies are loaded into or unloaded from the railroad car.

More generally, it is an object of the invention to provide a system for damage-free shipment of relatively large and bulky articles, such as automobile bodies, refrigerators, stoves, etc., which eliminates the need for crating the articles.

In the actual shipping of automobile bodies by railroad difficult problems of bracing the bodies and of stowing them are encountered. Articles within a freight car are subjected to extremely high loads which act in all directions and the bracing equipment must be designed to handle these loads and do it in such a way that ease of handling is maintained at an optimum. As will be discussed in more detail, the invention provides equipment which braces the automobile bodies against vertical movement up or down, against longitudinal movement lengthwise of the railroad car, and against transverse movement crosswise of the freight car. This bracing is accomplished in such a way as to provide a damping or shock absorption to minimize or eliminate the effects of the enormous impact loads thrown on a freight car in the course of its use, as during switching and humping.

Automobile bodies are most conveniently shipped in conventional type boxcars and in order to make full use of the space within the boxcars it is necessary to load the automobile bodies in the areas encompassed by the doorways on opposite sides. This presents a particularly difficult problem in the bracing of the loads in such a way that they can be readily handled and, as will be described hereinafter, a special doorway bracing structure for automobile bodies is provided herein to act in conjunction with the bracing system used elsewhere in the boxcar.

The invention is illustrated in the accompanying drawings in which:

Figure 1 is a side elevation of a railroad boxcar, schematic and diagrammatic, with the side walls removed showing a cargo bracing arrangement for automobile bodies in accordance with the invention, this figure representing approximately one longitudinal half of a boxcar;

Fig. 1a is a continuation of Fig. 1 showing the remaining longitudinal half;

Fig. 2 is a horizontal cross section through the boxcar of Fig. 1 taken above the intermediate deck, this figure showing approximately one longitudinal half of the car;

Fig. 2a is a continuation of Fig. 2;

Fig. 3 is an enlarged section taken along the line 3—3 of Fig. 2a;

Fig. 4 is an enlarged section taken along the line 4—4 of Fig. 2a;

Fig. 5 is a vertical cross section, somewhat diagrammatic, through the boxcar of the preceding figures;

Fig. 6 is a partial side elevation to show one automobile stowed above another;

Fig. 7 is a view, with parts removed, taken along the line 7—7 of Fig. 2a showing an anti-sway bar according to the invention;

Fig. 8 is a top plan view of the latch end of the anti-sway bar of Fig. 7;

Fig. 9 is a section taken along the line 9—9 of Fig. 7;

Fig. 10 is a section taken along the line 10—10 of Fig. 7;

Fig. 11 is a side elevation with parts removed from the inside of the boxcar looking out through the doorway and showing the improved doorway construction;

Fig. 12 is a longitudinal section through a side wall of the boxcar showing the improved doorway construction;

Fig. 13 is a view taken along the line 13—13 of Fig. 11;

Fig. 14 is an enlarged view of the structure in the circle 14 of Fig. 12;

Fig. 15 is a view of the threshold plate as taken along the line 15—15 of Fig. 11;

Fig. 16 is a detail view in side elevation of the upper bracing bar used in the doorway construction;

Fig. 17 is a top plan view of the bracing bar of Fig. 16;

Fig. 18 is a view taken from the right of Fig. 17;

Fig. 19 is a detail side elevation of the lower bracing bar;

Fig. 20 is a plan view of the lower bracing bar of Fig. 19;

Fig. 21 is an end view taken from the right of Fig. 19;

Fig. 22 is a side elevation of the vertical bracing post used to interconnect the upper and lower horizontal bracing bars;

Fig. 23 is a side elevation of the bracing support of Fig. 22;

Fig. 24 is an end view taken from the top of the post, that is the left-hand end of Figs. 22 or 23;

Fig. 25 is a plan view of a skid modified in accordance with the present invention and adapted to have automobile bodies rigidly secured thereto whereby they can be shipped in railroad cars; and Fig. 26 is a side elevation of the skid of Fig. 25.

Referring now to the drawings, it will be seen that the invention contemplates the shipping in a conventional railroad boxcar 1 of eight standard size automobile bodies 3, Four of these bodies are on an upper level and four on a lower level and four are in each longitudinal half of the boxcar 1. It will also be observed that boxcar 1 has doors 5 and 7 on opposite sides thereof which are of the usual sliding type and staggered or offset longitudinally of the car.

Each of the bodies 3 is attached by bolting to skid means which may be either the frame means shown in Figs. 25 and 26 or a pair of skis 9, which run longitudinally of the car. The skid means serves as a pallet or bottom surface which can be readily picked up by lift trucks or dollies or other suitable means in the course of handling the automobile bodies. If the automobile bodies 3 are sufficiently rigid to furnish transverse support the use of skis 9 may be indicated; but where the body is relatively fragile or where in the course of shipment it may be subjected to transverse forces tending to distort it, it is better to use frame means such as shown in Figs. 25 and 26 which is really a frame embodying transverse supports which would eliminate the automobile body itself as a load carrying member.

The present invention is applicable when the bodies 3 are supported upon skis or frame means or even other conceivable arrangements. In any event the bodies of modern automobiles are constructed of relatively thin gauge metal that can be easily dented or distorted so that holes or other attaching means formed therein will be out of alignment with parts to be subsequently connected to the automobile body. It is therefore the purpose of the present invention to provide an arrangement for expeditiously handling the automobile bodies 3 and at the same time preventing any damage from occurring to them while they are in transit within a railroad boxcar.

There is always a tendency in the shipment of specialized objects such as the automobile bodies 3 to design a special type of railroad car which is adapted in a peculiar way for their shipment. As a practical matter this solution to the problem of shipping automobile bodies is unsatisfactory. For one thing, the cost of building special railroad cars is bound to be considerably higher than the cost of using standard equipment. For another, there is a considerable amount of red tape involved in getting the special cars approved by the various authorities controlling use of the railroads. Lastly, there would be only a relatively small number of such cars in service and in view of the great mass of railroad rolling stock on the rails, the problem of scheduling usage of the small number of special cars could be extremely troublesome.

With this in mind we prefer to make use of railroad boxcars that are equipped with a standard type cargo bracing or freight loading equipment. In particular, it is our purpose to provide for the shipment of automobile bodies by means of boxcars equipped with loading equipment shown in Patent 2,725,826 and by related cases assigned to the assignee hereof. There are thousands of such cars in service; they are approved by the railroad authorities; they are useful for all types of cargo and not merely for the shipment of automobile bodies.

The characteristic of freight cars constructed in accordance with the aforementioned patent and its related cases is that they carry a series of vertically spaced longitudinally extending belt rails 11 which are preferably in the form of angles containing perforations or holes 12 in their horizontal flanges, the vertical flanges being welded to the side wall structure 13 of the boxcar (see Fig. 12). Transverse cargo bracing members or cross bars 15 are used to span the width of the boxcars and have attachment heads 17 at opposite ends which contain pairs of pins 18 to fit in the perforations 12 and a latch 19 to fit under the rail flange and thereby removably connect the cross bars to the belt rails 11. The structure of these cross bars is shown in detail and claimed in the aforementioned patent as well as in other pending applications including applications of H. L. Dunlap, Serial No. 545,195, filed November 7, 1955, as a divisional application of the above-mentioned patent and Serial No. 501,665, filed April 15, 1955, and an application of George M. Schueder, Serial No. 490,265, filed February 21, 1955, all of these cases being assigned to the assignee hereof.

The cross bars 15 have an elongated body structure extending throughout most of their lengths, that is between the attachment heads 17, which is a composite of wood and metal. Thus, there is a Z or S-shaped reinforcement metal member 21 that has a web portion 23 located in a midplane of the cross bar and oppositely extending side legs 25 located on the outside of the cross bar. Seated on opposite sides of the web 23 and bolted thereto are wooden buffers 27 which have surfaces that project beyond the adjacent edges of the legs 25 so that they will contact freight. These cross bars possess very important and significant damping or energy absorbing characteristics. In the present invention we take particular advantage of these characteristics to support the automobile bodies in such a way that the extremely high impact loads thrown upon freight cars are absorbed and damage to the automobile bodies is prevented.

Automobile bodies 3 within the boxcar 1 will be subjected to loads that tend to move them in fore and aft directions as well as vertically up and down with respect to the boxcar. As the principal means for absorbing and resisting these loads we employ a series of the cross bars 15. In the case of automobile bodies located on the lower level the downward vertical loads of the bodies may be carried directly by the floor 29 of the freight car. However, on the upper level the weight of the automobile bodies will be carried by a series of cross bars designated 15a as seen in Fig. 2. These cross bars are preferably positioned so that the webs 23 are vertical as this will provide them with maximum resistance to deflection in a vertical direction. The ends of the cross bars 15a are, of course, secured to a belt rail 11a along the side walls of the boxcar as seen clearly in Fig. 1.

In order to absorb and resist upward vertical loads and fore and aft loads on the various bodies 3, we use cross bars designated 15b which are located at opposite ends of the skis or skid. They fit in corners formed by angle brackets 31 that are welded on the ends of the skis or skid and the heads 17 at the opposite ends of the cross bars are attached to a belt rail 11b. In the illustrated embodiment the brackets 31 are located on a level with the tops of the cross bars 15a so that the cross bars 15b are on a slightly higher level as will be the corresponding belt rail that is used to support them, the rails 11a and 11b, however, being at standard levels for loader equipped cars. It will be seen that when there is an impact load in the direction of arrow 33 in Fig. 6 there will be forces 34 and 35 acting at the center of gravity of the body 3, 34 being the impact load and 35 being gravity load. These forces, or at least force 34, create a couple acting on the body 3, as represented by down load 36 and up load 37, that causes the body to tend to rotate or dive about a horizontal axis. The force 34 will be transmitted through the skis 9 to brackets 31 and thus into the cross bar 15b at the left of the figure which in turn will transmit the loads into the belt rail 11b on the boxcar side wall. The cross bars 15b are preferably positioned so that the reinforcement webs 23 are horizontal, thus providing them with maximum stiffness in a horizontal plane to minimize deflection of the cross bars under the impact loads. The rotational component on the automobile body 3, creating the tendency to dive about a horizontal axis located near the left-hand end, will be resisted by the action of the vertical flange of bracket 31 on the inside face of cross bar 15b at that end as well as by the cross bar 15a at that end. It will also be resisted by the horizontal flange on the bracket 31 at the other end of the body 3 which will engage the bottom of cross bar 15b to prevent the ski or skid from lifting up under the influence of force 37.

The skis or skids are not the full width of the boxcar and since they are not bolted to any of the cross members 15 there is a tendency for transverse loads, such as those due to centrifugal force when the boxcar rounds a curve, to cause the bodies to shift position within the boxcar. This tendency is resisted by means of anti-sway brace arms 41 which are attached at one end to the ski or skid and at the other end to a belt rail 11. There are preferably two such arms 41 on each side of the automobile body and means are provided to stow the arms in inactive position since in normal usage it is necessary to use the pair of arms on only one side of the body, the other arms then being stowed in the inactive position as will appear from Fig. 2.

Each arm 41 is identical and comprises a rod 43 having a bent inner end 45 which passes through a slot 47 in the horizontal flange of a bracket 49 which is welded to the side of the ski 9 or the skid as the case may be. A collar 51 is welded on the bent end 45 beneath the bottom of the bracket 49 and a retainer piece 53 is welded on top so that the end 45 cannot come out of the bracket but can move rather freely in it.

The other end of the rod 43 has a plate 55 welded to it and this carries two downwardly projecting pins 57 which are spaced apart by preferably a distance between adjacent holes 12 in the belt rails 11 so that the outer end of the arm 41 may be non-rotatably anchored in the belt rail 11b by projection of the pins 57 through the holes 12. It will be noted that the pins 57 have reduced ends 58 which pass through holes in the plate 55 and are headed like rivets at 58′. The arm 41, that is the pins 57 thereof, is kept from jumping out of the angle 11 by a latch sleeve 59 which slidably fits over the rod 43 but has a projecting lip 61 that will slide under the bottom of the horizontal flange of angle 11 to engage it and prevent the pins 57 from being lifted out of the flange. The latch sleeve 59 is urged to an active latching position by means of the coil spring 63 which is confined between it and a collar 65 welded on the rod 43. It is evident that the arm 41 can move a slight amount in a vertical direction as viewed in Fig. 7 to permit insertion and removal of the pins 57 from the belt rails 11, and that the elongated slot permits the braces to be attached despite misalignments of the skid or skis.

In order to stow the arms 41 in an inactive position storing clips or angles 67 are welded at appropriate positions as seen in Fig. 2 to the sides of the ski or skid and contain a pair of holes 69 to receive the pins 57 so that the arms can be latched to them in the positions paralleling the sides of the ski.

It will be evident that in the embodiment shown the length of the arms 41 is such that the bodies 3 are staggered thus permitting them to be stowed in nested relationship within the boxcar. It will be evident that the arms 41 could be of different lengths on the same side of the skid or ski so as to permit angling of the bodies 3 if desirable to increase the number of units which could be accommodated in the boxcar. It would also possible to have the arms 41 of such length that all four of them could be used simultaneously. However, it has been found that the action of a pair of arms on one side in conjunction with the cross members as already described, is adequate to prevent shifting of the bodies. The bodies are preferably stowed in positions spaced substantially from the side walls (though this may not be capable of full realization if the bodies 3 are so long as to require nesting and staggering) as this will enable them to take maximum advantage of energy absorption due to deflection of the wood-metal cross bars 15.

In loading the boxcar 1, the lower level automobile bodies 3 are brought in by a fork truck or dolly and put in position at each end of the boxcar after which the brace arms 41 are latched in place to the low level belt rail 11 and the impact cross members 15b are also latched in place. Then the upper level is prepared by placing cross bars 15a in position at each end of the car after which the upper level automobile bodies are deposited upon them by a fork truck. After this has been done the cross bars 15b can be put in place and attached to the belt rails 11b and the braces 41 attached. It is preferable to stagger the bodies in the two levels so that the upper level bodies are not directly above those in the lower level.

It will now be appreciated that the remaining space in the boxcar for the storage of automobile bodies includes the openings covered by doors 5 and 7. This means that removable members in alignment with the belt rails 11 must be provided to span the doorways so that when they are removed goods can be moved into or out of the boxcar and when they are in place the cross bars 15 and the cross arms 41 can be attached to them. The removable doorway members for this purpose must be of such a nature that the doors of the boxcar can be closed when they are in place and also designed so that the two tiers of automobile bodies 3 can be properly brought into the boxcar by means of available moving equipment.

In order to provide the foregoing type of removable bracing members for the doorways we utilize an upper doorway member 71 and a lower doorway member 73. Inasmuch as the span or width of the doorway may be in the neighborhood of twelve feet, we prefer to employ a vertical post or bracing member 75 to engage and support a central section of the upper doorway member 71. The upper doorway member 71 is shown in detail in Figs. 16–18 and it is removably supported by latch plates 80 welded to the inside faces of the door posts 81 as opposite sides of the doorway. The member 71 comprises an elongated body section 83 of a length almost equal to the distance between the door posts 81 and this may be conveniently formed of a box section by welding the ends of a channel and two angles together. At opposite ends the member 71 has latching devices which are identical. These are provided by welding an angle-shaped member 85, reinforced by gussets 86, to the end of the body 83. Belt rail sections 87 containing perforations 12 are welded to the brackets 85 as well as along the length of the body 83 and will form belt rails in continuation and alignment with the fixed belt rails 11a and 11b on the side wall of the boxcar. Spaced outwardly of the longitudinal leg portion of the bracket 85 is a fixed latch piece 91, reinforced by gusset 92, which, along with the clip 85 and pads 84, defines a mouth 93. A plate 95 is welded to the outer side of the body 83 and will act as a reinforcement as well as a mounting for outwardly pressed spring plunger devices 97, the outer ends 98 of which pass through slotted openings 99 in the bracket 85 on the outside of the plate 91. The plate 91 and the longitudinal leg of the bracket 85 are provided with aligned elongated apertures 101 which will receive a patch pin 107 that is attached by chain 109 to the structure of the freight car as indicated at 111. The latch pin has a collar 113 upon it so as to limit the distance to which it can be inserted from the outside into the aligned apertures 101. Brackets 104, of U-shape, are welded on the inside of angle 85 and these have holes 105 too small for the latch pin 107 to prevent the pin from being inserted the wrong way, the holes 105 permitting use of a knock-out pin if necessary.

In usage the mouth 93 at each end of the bar 71 is placed over the plate 80 that is welded to the inside face of the door post 81 and the four latch pins 107 are inserted. When the latch pins are inserted the handles of the plungers 97 are retracted and may be caught over the inside edges of plates 95 to be held in withdrawn position. After the pins are inserted, the handles are released so that spring pressure will force the ends 98 thereof to project behind the pins 107 to hold the latch pins in locking position.

The lower doorway member 73 (Figs. 19–21) is of a similar construction to the upper doorway member 71 which has just been described. Thus, it may comprise a pair of channels welded together to form a hollow box-like body section 121. The bottom of one of the channels is provided with a series of rigid projecting pins 123 which will fit in holes 125 (Fig. 15) that are cut into the boxcar threshold plate 127 and thus will assist in holding the doorway member 73 against transverse movement. At the opposite ends of the member 73 the means for attachment to plates 131 welded on the inside faces of the door posts 81 is the same, and this means is substantially the same as that already described for the upper member 71. This includes the angle-shaped bracket 133 that is welded to the ends of the body 121 and which has a longitudinal leg 135 to which the perforated belt rail angle 137 is welded as well as to the body 121 so as to provide a continuation of the lowest belt rail 11 on the side walls of the boxcar. A plate 139 is rigidly attached to the transverse leg of the angle and is spaced from the longitudinal leg to provide a mouth 143 which will fit over the plate 131 and it has an aperture 145 in alignment with an aperture in the plate and leg 135 of the angle. The U-shaped clip 145 is welded to the inside face of leg 135 to insure insertion of the latch pin 107 from the other side, the clip 145 having a knock-out hole 146 too small for pin 107. A plate 149 is welded on the outside of the channel and provides a mounting near its top for a spring plunger device 151 having a projecting end 153 that will engage behind a latch pin 107 to prevent its inadvertent removal. The top portion of the lower doorway member is provided with loops 155 that will receive a fork so that this relatively heavy member can be readily put into position by means of a fork truck such as may be used to move the bodies 3 into and out of the boxcar 1. If desired, loops 155 could be put on the upper doorway member 71.

The upper doorway member 71 is supported upon the lower doorway member by way of a vertical brace or post 75 which is shown in detail in Figs. 22–24. This may comprise a channel 161 having at its upper end a pad 163 in which are welded a pair of projecting pins 165 that will extend into holes formed in the belt rail angle section 87. The flat top 167 of the member 75 will engage the bottom surface of the body 83 and thus furnish support against downward deflection of the member 71. The bottom end of the channel 161 will rest on the top of the body 121 and has an angle 167 welded thereto with a rigid transverse pin 171 provided therein to project into a hole 172 on the lower doorway member 73. A spring pressed plunger latch pin device 175 containing a projecting pin portion 173 will extend into a hole 12 on the belt rail angle 137 and serve to removably latch the brace 75 to the lower doorway member 73.

Inasmuch as the doorway member 71 is heavy and should be handled by mechanical means, means are provided to minimize handling thereof by permitting it to remain connected at all times, even during loading of the boxcar 1, to the fixed door posts 81. It will be seen from Figs. 1 and 1a that in its operative position the member 71 provides very little, if any, head clearance for automobile bodies 3 to be moved into the interior of the boxcar 1. When bodies are to be moved in by a dolly or lift truck running on floor 29, the member 71 is too low; and when bodies are to be inserted in the doorway on an upper level, the member 71 is too high.

In order to permit the member 71 to be temporarily raised, we provide holes 181 in plates 80 which will receive the latch pins 107 to hold the member 71 in an elevated position giving sufficient head clearance to move bodies in or out of the boxcar by suitable means running on floor 29. In order to permit the member to be temporarily lowered, we provide ledges 183 in the form of angles 185 welded to posts 81 at the bottoms of plates 80 so that the bottom edges of angle 85 and plate 91 can rest thereupon to support the weight of member 71. In this case the latch pins 107 are not needed to hold the member 71, though it will be understood that holes could be provided for them, if desired, and in such case the ledges could be eliminated though this arrangement is obviously not as advantageous since it would permit the member 71 to slip off the bottom ends of plate 80. During these temporary changes in position of member 71 the relatively light brace 75 will, of course, be removed. The lower doorway member 73 can also be easily removed, if necessary, to permit a truck or dolly to be driven on to the floor 29 from a loading dock.

It will be observed from Figs. 1 and 1a that the total length of the four automobile bodies 3 is substantially the same as the total inside length of the boxcar 1; and, in fact, the bodies 3 are nested to some extent. Because of the longitudinal crowding of the particular bodies 3, we prefer to restrict deflection of the cross bars 15 in a longitudinal direction in those areas where such deflection might cause damage to the automobile bodies. Thus, at opposite ends of the boxcar 1 we provide bumpers 187 which engage the end impact bars 15b to restrict deflection thereof toward the adjacent end wall of the boxcar. At the right-hand side of Fig. 2 it will be seen that adjacent bodies 3 are not nested but are spaced just a slight amount apart as are the respective impact bars 15b for the frame means carrying the bodies 3. Between the impact bars 15b there is room for an additional bar cross member 15c which we attach to the belt rails 11b in the same manner as the bars 15b and this will serve to prevent substantial longitudinal deflection of the adjacent bars 15b.

It will be evident from the disclosure in the aforementioned patent and applications that loads on the cross bars 15 are transmitted through the end heads 17 thereof into the belt rails 11. Where the rails are fixed, that is in the side wall area where they are welded to vertical posts forming a part of the side wall 13, these loads go directly into the boxcar structure. In the doorway area gravity or vertical loads will be taken by the pins 107 and transmitted into the plates 80 and 131 and thence into the fixed posts 81. Longitudinal loads, however, will not be thrown to any great extent on the pins 107 since the slots 101 and 145 give sufficient telescopic or relative longitudinal movement of the members 71 and 73 to permit longitudinal loads to be transmitted by abutment of the end surfaces of the doorway members with the posts 81 or the pads 84 and 132 with the outer edges of the plates 80 and 131, respectively. The elongated holes just mentioned will also accommodate any slight deflection of the doorways and, of course, the cross bars 15 are telescopic on at least one end to accommodate weaving or breathing of the side walls 13.

Figs. 25 and 26 show a different form of frame means for the bodies 3 than the skis 9, namely a skid 201. This comprises a rigid frame having longitudinal side members 203 and transverse brace members 205 as well as rigid longitudinal members 207 and 209 welded to the transverse members. Various pads 211 are welded to different points on the frame to extend above the plane thereof and these contain holes located to be in alignment with holes on the particular automobile body to be bolted thereto. At the ends of the frame are welded the upwardly and outwardly facing angle brackets 213 and 215, the latter also being a transverse brace, which corresponds to brackets 31 and are provided to receive impact cross bars 15b. Anti-sidesway braces 217, of substantially the same construction as braces 41 of Figs. 7–10, are pivoted to brackets 219 on the side members 203 and can be latched in inactive positions to perforated angle sections 221 welded to the sides 203.

What we claim is:

1. In a railroad boxcar or the like having a pair of longitudinally extending horizontal belt rails mounted on opposite side walls thereof and disposed substantially opposite each other and at substantially the same elevation above the boxcar floor and including a pair of longitudinally spaced freely telescopable crossbars extending transversely of said boxcar and connected at their opposite ends to said belt rails, a skid having means for affixing an article of freight thereto, means mounting said skid in said boxcar with said skid extending longitudinally of said boxcar, said last named means including means on said boxcar supporting said skid substantially at the level of said belt rails, means on said skid engaging said crossbars and holding said skid against movement longitudinally of said boxcar, and a pair of bracing arms carried by and spaced longitudinally of said skid and each having one end movably connected to a side of the skid and means at its opposite end detachably attached to one of said belt rails.

2. The invention as defined in claim 1 including means on opposite ends of said skid engaging said crossbars and holding said skid against upward movement relative to said crossbars.

3. In a cargo bracing system for a moving vehicle having opposite side walls, a pair of spaced parallel crossbars extending substantially horizontally and transversely of said vehicle, co-operating means on the ends of said crossbars and on said side walls for detachably connecting said crossbars to said side walls, and support means on said vehicle, skid means to which an article of freight may be removably attached, said skid means being disposed between said side walls and extending longitudinally of said vehicle, said support means on said vehicle supporting said skid means substantially at the elevation of said crossbars, spaced crossbar engaging brackets on said skid means and each including co-operating crossbar engaging surfaces, said surfaces of one of said brackets engaging one of said crossbars and said surfaces of another of said brackets engaging another of said crossbars and said surfaces co-operating with said crossbars to hold said skid means against movement longitudinally of said vehicle and against movement upwardly.

4. The invention set forth in claim 3 wherein said support means includes a plurality of crossbars and means securing them to said side walls so that their top surfaces define a horizontal decking plane substantially at the elevation of said pair of spaced parallel crossbars and wherein each of said crossbars comprises a substantially Z-shaped metal reinforcement member having a web portion and leg portions extending in opposite directions from the web portion and wooden buffer bars secured on opposite sides of said web portion and against the respective leg portions, said skid means being supported on said upper surfaces of said decking plane providing crossbars, said web portions of said decking plane providing crossbars extending at right angles to said decking plane, and said web portions of said pair of spaced parallel crossbars extending parallel to said decking plane.

5. The invention set forth in claim 4 wherein there is at least one of said decking plane providing crossbars located closely adjacent to each of the crossbars of said pair of spaced parallel crossbars.

6. In a railroad boxcar, vertical side walls on opposite sides of the boxcar, means providing a doorway opening in a side wall, belt rails affixed to each of said opposite side walls and extending horizontally and longitudinally of the car and located opposite each other on spaced vertical levels, horizontally disposed removable doorway members, means in said doorway providing means for supporting said doorway members at predetermined vertical levels, said doorway members having belt rails thereon arranged to be in alignment with certain of said belt rails on said side walls, automobile body carrying frame means, horizontally extending cross members secured to said belt rails on a common level located above the floor of the boxcar to provide a deck supporting said frame means, means connected to said side walls engaging said frame means to hold it against movement longitudinally of said boxcar and anti-sway braces carried on said frame means having one end movably secured to said frame means and having the other end removably connected to said belt rails of said doorway members.

7. In a cargo bracing system for shipping automobile bodies in railroad boxcars, said boxcar having opposite side walls with opposed belt rails affixed to each at a level close to the floor of the boxcar and at two intermediate vertical levels, a plurality of frame means for carrying automobile bodies and resting on said floor, crossbars supporting said frame means against impact loads, said crossbars extending transversely of the boxcar at opposite ends of the frame means and removably anchored to said first named level belt rails, bracket means on each end of each of said frame means engaging and co-operating with the adjacent one of said crossbars to absorb impact loads longitudinally of the car and vertical loads in an upward direction, a second level of frame means for carrying automobile bodies, transverse crossbars anchored to belt rails at the lower of said intermediate two belt rail levels and supporting said second level of frame means, a single crossbar at each end of each frame means of said second level secured to said belt rails at the upper of said intermediate belt rail levels, and bracket means on each end of the frame means of said second level engaging and co-operating with the adjacent said single crossbar to absorb impact loads longitudinally of the car and vertical loads in an upward direction.

8. The invention set forth in claim 7 wherein one of said side walls has a doorway opening therein and including upper and lower horizontally disposed removable doorway members removably mounted in said doorway opening and providing belt rail sections in alignment with said floor and intermediate level belt rails and having certain of said crossbars connected thereto.

9. The invention set forth in claim 8 including removable latch pins for holding said doorway members in place, and means providing abutment surfaces between the ends of said doorway members and the sides of the doorway opening so that loads parallel to the length of the doorway members are transferred into the side of the doorway.

10. In a cargo bracing system for railroad boxcars for the shipment of bulky articles such as automobile bodies, said boxcar having opposite side walls with opposed belt rails fixed thereto at an intermediate level, said boxcar having a doorway opening in one side wall defined by longitudinally spaced vertical door posts, each of said posts having an inwardly extending latch plate thereon, a horizontally disposed vertically movable doorway member having belt rail sections thereon adapted to normally be placed in a position of alignment with said belt rails in said boxcar, and means on said latch plates co-operable with said doorway member for temporarily holding said doorway member in positions both above and below said alignment position to provide head room for the movement of articles above and below the level of said intermediate belt rail.

11. The invention set forth in claim 10 including means providing latch mouths on opposite ends of said removable doorway member to fit over said latch plates, removable latch pins adapted to removably connect the doorway member and the latch plate together, and means on the doorway member to prevent inadvertent removal of the latch pins.

12. The combination defined in claim 1 wherein each of said belt rails has a horizontally extending flange having a plurality of spaced apertures extending vertically therethrough and wherein said last named means includes pin means on said arm selectively received in said apertures of said one of said belt rails, latch means mounted on said arm for movement to and from a latched position in which it extends under said flange of said one of said belt rails and prevents withdrawal of said pin means from said apertures thereof, and means yieldably holding said latch means in said latched position.

13. The combination defined in claim 12 wherein said pin means comprises a pair of pins depending from said arm and received in adjacent ones of said apertures, said latch means comprising a sleeve slidable longitudinally of said arm and having a lip which extends under said flange of said one of said rails when said latch means is in said latched position, and means yieldably holding said latch means in latched position comprises a coil spring mounted on said arm and urging said sleeve outwardly thereof to a position in which, when said pins are received in said apertures of said one of said rails, said lip extends under said flange.

References Cited in the file of this patent
UNITED STATES PATENTS

| | | |
|---|---|---|
| 1,659,660 | Meredith et al. | Feb. 21, 1928 |
| 1,661,439 | Michod | Mar. 6, 1928 |
| 1,661,458 | Baus | Mar. 6, 1928 |
| 1,749,758 | Copony | Mar. 11, 1930 |
| 1,894,534 | Dolan | Jan. 17, 1933 |
| 2,107,932 | Butterworth et al. | Feb. 8, 1938 |
| 2,128,376 | Nampa | Aug. 30, 1938 |
| 2,160,079 | Nampa | May 30, 1939 |
| 2,164,661 | Nampa | July 4, 1939 |
| 2,262,085 | Allen | Nov. 11, 1941 |
| 2,514,229 | Fahland | July 4, 1950 |
| 2,613,615 | Nampa | Oct. 14, 1952 |
| 2,679,214 | Nampa | May 25, 1954 |
| 2,695,568 | Keith | Nov. 30, 1954 |
| 2,725,826 | Tobin et al. | Dec. 6, 1955 |
| 2,808,789 | Stough | Oct. 8, 1957 |
| 2,827,960 | Keating et al. | Mar. 25, 1958 |

UNITED STATES PATENT OFFICE

CERTIFICATION OF CORRECTION

Patent No. 2,956,517                          October 18, 1960

Harvey W. Chapman et al.

It is hereby certified that error appears in the above numbered patent requiring correction and that the said Letters Patent should read as corrected below.

Column 6, line 36, for "as" read -- at --; line 59, for "patch" read -- latch --; column 10, line 30, after "of", first occurrence, insert -- each of --.

Signed and sealed this 25th day of April 1961.

(SEAL)
Attest:

ERNEST W. SWIDER
Attesting Officer

DAVID L. LADD
Commissioner of Patents